United States Patent
Ramirez Corredores et al.

(10) Patent No.: US 9,617,489 B2
(45) Date of Patent: *Apr. 11, 2017

(54) LIQUID BIO-FUELS

(71) Applicant: KiOR, Inc., Pasadena, TX (US)

(72) Inventors: Maria Magdalena Ramirez Corredores, Houston, TX (US); Lorenz J. Bauer, Pasadena, TX (US); Vicente Sanchez, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 500 days.

This patent is subject to a terminal disclaimer.

(21) Appl. No.: 14/153,830

(22) Filed: Jan. 13, 2014

(65) Prior Publication Data

US 2014/0123662 A1 May 8, 2014

Related U.S. Application Data

(63) Continuation-in-part of application No. 13/025,483, filed on Feb. 11, 2011, now Pat. No. 8,628,589, and
(Continued)

(51) Int. Cl.

| | |
|---|---|
| *C10L 1/16* | (2006.01) |
| *C10L 1/18* | (2006.01) |
| *C10G 3/00* | (2006.01) |
| *F02B 45/10* | (2006.01) |
| *F02C 3/24* | (2006.01) |

(Continued)

(52) U.S. Cl.
CPC .............. *C10L 1/1802* (2013.01); *C10G 1/02* (2013.01); *C10G 3/44* (2013.01); *C10G 3/49* (2013.01); *C10L 1/02* (2013.01); *F02B 45/10* (2013.01); *F02C 3/24* (2013.01); *C10G 2300/1011* (2013.01); *C10G 2400/06* (2013.01); *C10G 2400/08* (2013.01); *C10L 2290/02* (2013.01);
(Continued)

(58) Field of Classification Search
CPC ...... C10L 1/1802; C10L 1/02; C10L 2290/12; C10L 2290/02; C10L 2290/54; C10G 1/02; C10G 3/49; C10G 3/44; C10G 2400/06; C10G 2300/1011; C10G 2400/08; F02C 3/24; F02B 45/10; Y02P 30/20
USPC ................................ 585/240–242
See application file for complete search history.

(56) References Cited

U.S. PATENT DOCUMENTS

| | | |
|---|---|---|
| 4,209,647 A | 6/1980 | Gallivan et al. |
| 4,396,487 A | 8/1983 | Strumskis |

(Continued)

FOREIGN PATENT DOCUMENTS

| | | |
|---|---|---|
| CN | 101824330 | 9/2010 |
| CN | 101875846 | 11/2010 |

(Continued)

OTHER PUBLICATIONS

Search Report and Written Opinion dated Apr. 13, 2015 for corresponding PCT Patent Application No. PCT/US2015/010056, filed Jan. 2, 2015, 17 pages.

(Continued)

*Primary Examiner* — Pamela H Weiss
(74) *Attorney, Agent, or Firm* — Hovey Williams LLP (57) ABSTRACT

Liquid bio-fuels and processes for their production are provided. The liquid bio-fuels can have improved stability, less corrosiveness, and/or an improved heating value.

33 Claims, 3 Drawing Sheets

Related U.S. Application Data a continuation-in-part of application No. 13/212,861, filed on Aug. 18, 2011, now Pat. No. 9,315,739.

(51) Int. Cl.
  *C10L 1/02* (2006.01)
  *C10G 1/02* (2006.01)

(52) U.S. Cl.
  CPC ....... *C10L 2290/12* (2013.01); *C10L 2290/54* (2013.01); *Y02P 30/20* (2015.11)

(56) References Cited

U.S. PATENT DOCUMENTS

| | | | |
|---|---|---|---|
| 4,645,585 | A | 2/1987 | White |
| 5,820,640 | A | 10/1998 | Ikura et al. |
| 5,877,380 | A | 3/1999 | Conroy et al. |
| 7,262,331 | B2 | 8/2007 | van de Beld et al. |
| 7,279,018 | B2 | 10/2007 | Jakkula et al. |
| 7,425,657 | B1 | 9/2008 | Elliott et al. |
| 7,638,314 | B2 | 12/2009 | Zappi et al. |
| 7,781,191 | B2 | 8/2010 | Dunson et al. |
| 7,861,696 | B2 | 1/2011 | Lund |
| 8,202,332 | B2 | 6/2012 | Agblevor |
| 8,236,977 | B2 | 8/2012 | Woods et al. |
| 8,545,581 | B2 | 10/2013 | Agblevor |
| 8,628,589 | B2 * | 1/2014 | Ramirez Corredores et al. .......... C10L 1/02 44/307 |
| 9,206,365 | B2 * | 12/2015 | Ramirez Corredores et al. .......... C10L 1/02 |
| 9,382,489 | B2 * | 7/2016 | Ramirez-Corredores et al. .......... C10L 1/02 |
| 2006/0041152 | A1 | 2/2006 | Cantrell et al. |
| 2007/0161095 | A1 | 7/2007 | Gurin |
| 2007/0261296 | A1 | 11/2007 | Adams et al. |
| 2008/0006520 | A1 | 1/2008 | Badger et al. |
| 2008/0312476 | A1 | 12/2008 | McCall |
| 2009/0065378 | A1 | 3/2009 | Maas |
| 2009/0166256 | A1 | 7/2009 | Lewis et al. |
| 2009/0182064 | A1 | 7/2009 | Griffin |
| 2009/0227823 | A1 | 9/2009 | Huber et al. |
| 2009/0229173 | A1 | 9/2009 | Gosling |
| 2009/0250376 | A1 | 10/2009 | Brandvold et al. |
| 2009/0253947 | A1 | 10/2009 | Brandvold et al. |
| 2009/0253948 | A1 | 10/2009 | McCall et al. |
| 2009/0259082 | A1 | 10/2009 | Deluga et al. |
| 2009/0294324 | A1 | 12/2009 | Brandvold et al. |
| 2009/0301930 | A1 | 12/2009 | Brandvold et al. |
| 2009/0318737 | A1 | 12/2009 | Luebke |
| 2010/0212215 | A1 | 8/2010 | Agblevor |
| 2011/0138681 | A1 | 6/2011 | Corredores et al. |
| 2011/0192072 | A1 | 8/2011 | Steele et al. |
| 2011/0245489 | A1 | 10/2011 | Steele et al. |
| 2012/0000821 | A1 | 1/2012 | Yang et al. |
| 2012/0204479 | A1 | 8/2012 | Ramirez Corredores et al. |
| 2012/0204481 | A1 | 8/2012 | Corredores et al. |
| 2012/0289440 | A1 | 11/2012 | Pollard et al. |
| 2013/0043192 | A1 | 2/2013 | Smith et al. |
| 2013/0144089 | A1 | 6/2013 | Fjare et al. |

FOREIGN PATENT DOCUMENTS

| | | |
|---|---|---|
| EP | 0718392 | 9/1999 |
| EP | 1719811 | 11/2006 |
| EP | 2107100 | 10/2009 |
| KR | 10-0857247 | 9/2008 |
| KR | 100857247 B1 | 9/2008 |
| WO | 2006037368 | 4/2006 |
| WO | 2007128798 | 11/2007 |
| WO | 2007128800 | 11/2007 |
| WO | 2009014859 | 1/2009 |
| WO | 2009111026 | 9/2009 |
| WO | 2009126508 | 10/2009 |
| WO | 2010002792 | 1/2010 |
| WO | 2010008686 | 1/2010 |
| WO | 2010033512 | 3/2010 |
| WO | 2010088486 | 8/2010 |
| WO | 2010124069 | 10/2010 |
| WO | 2012027986 A2 | 5/2012 |

OTHER PUBLICATIONS

Chinese Office Action dated Sep. 17, 2014 for related Chinese Patent Application No. 201280008458.0, 8 pages.
Jani Lehto et al., Fuel Oil Quality and Combustion of Fast Pyrolysis Bio-Oils, Espoo 2013, VTT Technology 87, 84 pages.
Technical Information Exchange on Pyrolysis Oil: Potential for a Renewable Heating Oil Substitution Fuel in New England, Workshop Report: Pyrolysis Oil Technical Information Exchange Workshop Summary Report, May 9-10, 2012, Manchester, New Hampshire, Energetics Incorporated, Columbia, Maryland, Bioenergy Technologies Office, Washington, DC, 59 pages.
Search Report and Written Opinion dated Sep. 25, 2012 for PCT Application No. PCT/US2012/022945, filed Jan. 27, 2012; Applicant: KiOR, Inc., 13 pages.
Chiaramonti et al., Development of Emulsions from Biomass Pyrolysis Liquid and Diesel and Their Use in Engines, Part 1: Emulsion Production, Biomass & BioEnergy 25 (2003) 85-99.
Czernik et al., Overview of Applications of Biomass Fast Pyrolysis Oil, Energy & Fuels 2004, 18, 590-598.
Czernik et al., Stability of Wood Fast Pyrolysis Oil, Biomass and Bioenergy, vol. 7, Nos. 1-6, 187-192.
Garcia-Perez et al., Production and Fuel Properties of Fast Pyrolysis Oil/Bio-Diesel Blends, Fuel Processing Technology, 91 (2010), 296-305.
Hilten, et al., Comparison of three accelerated aging procedures to assess bio-oil stability, Fuel 89 (2010), 2741-2749.
Ikura et al., Emulsification of pyrolysis derived bio-oil in diesel fuel, Biomass & BioEnergy 24 (2003), 221-232.
Mahinpey et al., Analysis of Bio-Oil, Biogas, and Biochar from Pressurized Pyrolysis of Wheat Straw Using a Tubular Reactor, Energy & Fuels, 2009, 23, 2736-2742.
Moens, et al., Study of the Neutralization and Stabilization of Mixed Hardwood Bio-Oil, Energy & Fuels, 2009, 23, 2695-2699.
Oasmaa et al., Fast Pyrolysis of Forestry Residue. 3. Storage Stability of Liquid Fuel, Energy & Fuels 2003, 17, 1075-1084.
Ol et al., Review of biomass pyrolysis oil properties and upgrading research, Energy Conversion & Management, 48, (2007), 87-92.
Ringer et al., Large-Scale Pyrolysis Oil Production: A Technology Assessment and Economic Analysis, NREL Technical Report, NREL/TP-510-37779, Nov. 2006.
Diebold, A Review of the Chemical and Physical Mechanisms of the Storage Stability of Fast Pyrolysis Bio-oils, NREL/SR-570-27613, Jan. 2000.
Chinese Office Action dated Apr. 29, 2015 for related Chinese Patent Application No. 201280008458.0, 3 pages.
European Extended Search Report and Written Opinion for related European Patent Application No. 12745278.7; Dated Dec. 21, 2016, 8 pages.

\* cited by examiner

LIQUID BIO-FUELS

CROSS REFERENCE TO RELATED APPLICATIONS

This application is a continuation-in-part of U.S. patent application Ser. No. 13/025,483, filed Feb. 11, 2011 and is a continuation-in-part of U.S. patent application Ser. No. 13/212,861, filed Aug. 18, 2011.

FIELD OF THE INVENTION

This invention relates generally to renewable fuels. More particularly, this invention relates to liquid bio-fuels and processes for producing liquid bio-fuels.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into hydrocarbon chemicals, specialty chemicals, and/or other useful products, e.g., bio-fuel, such as, transportation fuels and heating oil.

Despite recent advancements in biomass conversion processes, many of the existing biomass conversion processes produce low-quality bio-oils containing high amounts of oxygen, which are difficult, if not impossible, to separate into various fractions. These bio-oils require extensive secondary upgrading in order to be utilized as heating oils or heating fuels due to the high amounts of oxygen present in the bio-oil.

More specifically, the production of bio-oil by pyrolysis, both fast and slow, can be problematic. Pyrolysis is characterized by the thermal decomposition of materials in an oxygen-poor or oxygen-free atmosphere (i.e., significantly less oxygen than required for complete combustion). In the past, pyrolysis has referred to slow pyrolysis whose equilibrium products included non-reactive solids (char and ash), liquids (tar and/or pyroligneous liquor), and non-condensable gases.

More recently, it has been recognized that pyrolysis can be carried out through a fast (rapid or flash) pyrolysis method where finely divided feedstock is rapidly heated and the reaction time is kept short, i.e. on the order of seconds. Such fast pyrolysis results in high yields of primary, non-equilibrium liquids and gases (including valuable chemicals, chemical intermediates, hydrocarbon chemicals and bio-fuels).

The non-equilibrium liquids (or bio-oil) produced by fast pyrolysis are suitable as a fuel for clean, controlled combustion in boilers and for use in diesel and stationary turbines. In fact, such bio-oil liquids offer some distinctive advantages for heating and power production over biomass gasification products and direct combustion of the biomass. Some of the advantages of bio-oil are:

Higher energy densities compared to direct combustion of the raw biomass;
More easily/cost effective to transport and handle than raw biomass or producer gas;
Existing boilers may be used with bio-oil, subject only to retrofitting;
Fewer emissions in boiler use compared to solid fuels due to better control of the combustion process; and
Bio-oil from pyrolysis processes is the least cost liquid bio-fuel for stationary use and its net $CO_2$-balance is better than that of other bio-fuels.

However, besides all those advantages, instability, corrosiveness and low heating value compared to conventional heating oil, have precluded a full success of pyrolysis bio-oils as a heating fuel. Moreover, it has been recognized that pyrolysis derived bio-oils are unsuitable for use as a heating oils and cannot be directly used as a heating oil without subsequent hydrotreating (see for example EP 0718392 and WO 2009/126508). In fact EP 0718392 notes that hydrotreating to completely remove oxygen from bio-oil would represent a major and prohibitive cost because of the high oxygen content of pyrolysis derived bio-oil. Further, in order for bio-oil to be used in certain fuel-powered devices, e.g., devices that utilize petroleum-based fuel, the device and its ancillary equipment may require a broad range of modifications. For example, in certain boilers or other fuel-powered devices, one may need to modify the ignition system in order to use a bio-oil in such a device.

Accordingly, it would be advantageous to develop a pyrolysis derived bio-oil that could be used as a bio-fuel, e.g., heating oil, wherein such bio-fuel has improved stability, less corrosiveness and higher heating value than prior art bio-oils without having to undergo hydrotreating or other deoxygenating processes. Further, there is a need for a bio-fuel that can be used in a fuel-powered device, e.g., a device designed for use with petroleum-based fuel, without having to modify such a device and its ancillary equipment.

SUMMARY

In one embodiment of the present invention, there is provided a liquid bio-fuel including 50 to 95 weight percent oxygenated hydrocarbons, 5 to 50 weight percent nonoxygenated hydrocarbons, not more than 15 weight percent water, and not more than 2,500 ppmw solids. The liquid bio-fuel has an ignition temperature in the range of 175 to 300° C. and a higher heating value of at least 9,000 btu/lb.

In another embodiment of the present invention, there is provided a liquid bio-fuel composition including oxygenated hydrocarbons in an amount such that the bio-fuel has an oxygen content of less than 30 weight percent, and nonoxygenated hydrocarbons having an aromatic content greater than 40 weight percent. The high heating value of the bio-fuel is greater than 10,000 btu/lb. In addition, the bio-fuel has a stability parameter of less than 30 cP/h.

In another embodiment of the present invention, there is provided a method of operating a fuel-powered device. The method includes (a) combusting a petroleum-derived fuel in a fuel-powered device to thereby produce thermal and/or mechanical energy, and (b) combusting a biomass-derived fuel in the fuel-powered device to thereby produce thermal and/or mechanical energy, where the fuel-powered device is not mechanically modified to account for the fuel change between steps (a) and (b), where biomass-derived fuel is produced via pyrolysis of biomass.

BRIEF DESCRIPTION OF THE DRAWING FIGURES

Embodiments of the present invention are described in detail below with reference to the attached figures, wherein.

DETAILED DESCRIPTION

Figure 1:
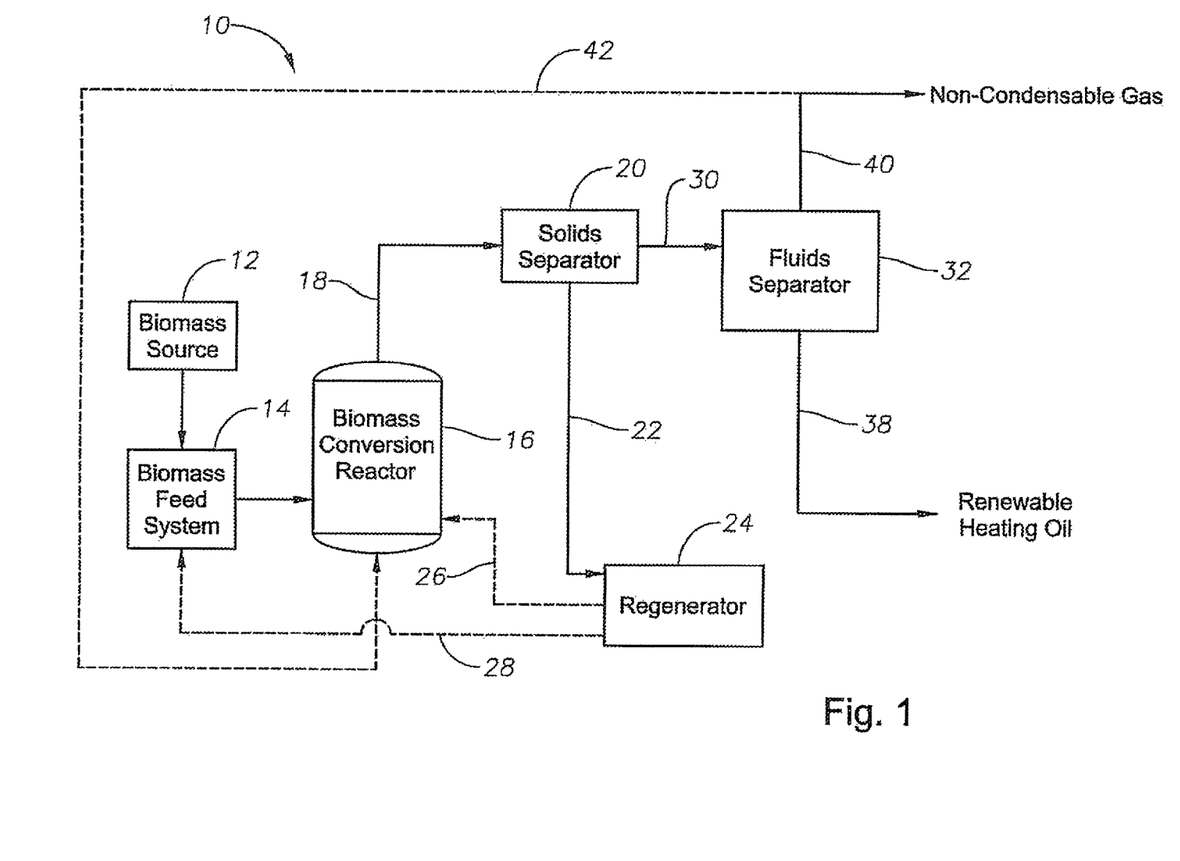
FIG. 1 is a schematic diagram of a biomass conversion system according to one embodiment of the present invention.

The following detailed description of various embodiments of the invention references FIG. 1, which illustrates a biomass conversion system suitable for use in producing bio-fuel, e.g., renewable heating oil, in accordance with the invention. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Pyrolysis as used herein refers to non-catalytic pyrolysis processes. Fast pyrolysis processes are pyrolysis processes for converting all or part of the biomass to bio-oil by heating the biomass in an oxygen-poor or oxygen-free atmosphere. The biomass is heated to pyrolysis temperature for a short time compared with conventional pyrolysis process, i.e. less than 10 seconds. Pyrolysis temperatures can be in the range of from about 200° C. to about 1000° C. Often the biomass will be heated in a reactor using an inert heat carrier, such as sand. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 weight percent oxygen.

Biomass catalytic cracking (BCC) as used herein refers to a catalytic pyrolysis, wherein a catalyst is used to help facilitate cracking of the biomass components and compounds under fast pyrolysis type conditions. Accordingly, in a BCC process a catalyst is used in the reactor to facilitate the conversion of the biomass to bio-oil. The catalyst can be pre-mixed with the biomass before introduction into the reactor or be introduced into the reactor separately. If introduced into the reactor separately, a particulate catalyst can be used in place of all or part of the inert heat carrier.

The present invention is directed to liquid bio-fuel compositions, e.g., heating fuel compositions, having chemical and physical properties that are particularly suited for use as a heating oil or heating fuel in furnaces, boilers or stoves. In particular, the invention aims to define a liquid bio-fuel composition, e.g., a renewable heating oil composition, with increased stability, lower corrosiveness, and increased heating value as compared with pyrolysis oil. The liquid bio-fuel of the current invention may be a renewable heating oil composition characterized by having a heating value greater than about 10,000 btu/lb. More preferably, the heating value will be above about 11,000 btu/lb. and, generally, from about 11,000 btu/lb. to about 18,000 btu/lb., or about 14,000 btu/lb. to about 18,000 btu/lb. In certain embodiments, the bio-fuel may have a high heating value of at least 7,500, 9,000, or 10,500 btu/lb. and/or not more than 17,500, 15,500, or 13,500 btu/lb., as determined according to ASTM D240. For example, in one or more embodiments, the bio-fuel may have a high heating value in the range of from 7,500 to 17,500 btu/lb., 9,000 to 15,500 btu/lb., or 10,500 to 13,500 btu/lb.

Additionally, the bio-fuel composition, e.g., the renewable heating oil composition, of the current invention may be characterized by being comprised of mainly hydrocarbons and the hydrocarbons consist of (i) an oxygenated component, i.e., oxygenated hydrocarbons, that may be present in an amount such that the renewable heating oil composition has an oxygen content of less than about 30 weight percent, and (ii) a non-oxygenated component, i.e., nonoxygenated hydrocarbons, having an aromatic content greater than about 40 weight percent. Preferably, the oxygenated component is present in an amount such that the bio-fuel composition, e.g., the renewable heating oil composition, has an oxygen content from about 5 weight percent to about 30 weight percent, more preferably, from about 6 weight percent to about 20 weight percent, and even more preferably from about 7 weight percent to about 15 weight percent. Preferably, the aromatic content of the non-oxygenated component will be from about 40 weight percent to about 60 weight percent. The oxygen content for the bio-fuel composition, e.g., the renewable heating oil composition, indicated here in is on a dry basis; that is without including the oxygen content of any water present in the renewable heating oil composition. The amount of nonoxygenated hydrocarbons, oxygenated hydrocarbons, and aromatic hydrocarbons can be determined by one skilled in the art using known methods, such as, for example, gas chromatography-mass spectrometry.

In certain embodiments, the liquid bio-fuel composition of the present invention may include oxygenated hydrocarbons in an amount of at least 50, 65, or 75 wt. % and/or not more than 98, 95, or 90 wt. %. For example, in one or more embodiments, the liquid bio-fuel composition may include oxygenated hydrocarbons in an amount of from 50 to 98 wt. %, 65 to 95 wt. %, or 75 to 90 wt. %. In certain embodiments, the liquid bio-fuel composition of the present invention may include nonoxygenated hydrocarbons in an amount of at least 2, 5, or 10 wt. % and/or not more than 50, 35, or 25 wt. %. For example, in one or more embodiments, the liquid bio-fuel composition may include nonoxygenated hydrocarbons in an amount of from 2 to 50 wt. %, 5 to 35 wt. %, or 10 to 25 wt. %. The amount of oxygenated hydrocarbons and nonoxygenated hydrocarbons can be determined by one skilled in the art using known methods, such as, for example, gas chromatography-mass spectrometry.

In certain embodiments, the liquid bio-fuel composition of the present invention may not have any phenolic oxygenated hydrocarbons, or may have at least 1 or 2 wt. % phenolic oxygenated hydrocarbons based on the total weight of the oxygenated hydrocarbons present in the liquid bio-fuel. In the same or alternative embodiments, the liquid bio-fuel composition may include not more than 40, 50, 60 or 80 wt. % phenolic oxygenated hydrocarbons based on the total weight of the oxygenated hydrocarbons present in the liquid bio-fuel. For example, in one or more embodiments, the liquid bio-fuel composition of the present invention may include phenolic oxygenated hydrocarbons in an amount of from 0 to 80 wt. %, 0 to 60 wt. %, 1 to 50 wt. %, or 2 to 40 wt. %, where the wt. % of phenolic oxygenated hydrocarbons is based on the total weight of the oxygenated hydrocarbons present in the liquid bio-fuel. The amount of phenolic oxygenated hydrocarbons can be determined by one skilled in the art using known methods, such as, for example, gas chromatography-mass spectrometry.

In various embodiments, the liquid bio-fuel composition of the present invention may include at least 30, 40, or 50 wt. % and/or not more than 98, 95, or 90 wt. % aromatic nonoxygenated hydrocarbons based on the total weight of the nonoxygenated hydrocarbons present in the liquid bio-fuel. For example, in certain embodiments, the liquid bio-fuel composition may include 30 to 98 wt. %, 40 to 95 wt. %, or 50 to 90 wt. % aromatic nonoxygenated hydrocarbons based on the total weight of the nonoxygenated hydrocarbons present in the liquid bio-fuel. The amount of aromatic nonoxygenated hydrocarbons can be determined by one skilled in the art using known methods, such as, for example, gas chromatography-mass spectrometry.

In certain embodiments, the liquid bio-fuel composition of the present invention may have an oxygen content in an amount of at least 2, 5, or 10 wt. % and/or not more than 30, 25, or 22 wt. %, as determined according to ASTM test method D3176. For example, in one or more embodiments, the liquid bio-fuel composition may have an oxygen content in an amount of from 2 to 30 wt. %, 5 to 25 wt. %, or 10 to 22 wt. %.

In one or more embodiments, the liquid bio-fuel composition of the present invention may have a carbon content in an amount of at least 40, 50, or 65 wt. % and/or not more than 95, 90, or 80 wt. %, as determined according to ASTM test method D5291. For example, in certain embodiments, the liquid bio-fuel composition may have a carbon content of from 40 to 95 wt. %, 50 to 90 wt. %, or 65 to 80 wt. %.

In one or more embodiments, the liquid bio-fuel composition of the present invention may have a hydrogen content in an amount of at least 2, 4, or 6 wt. % and/or not more than 20, 12, or 8 wt. %, as determined according to ASTM test method D5291. For example, in certain embodiments, the liquid bio-fuel composition may have a hydrogen content of from 2 to 20 wt. %, 4 to 12 wt. %, or 6 to 8 wt. %.

In one or more embodiments, the liquid bio-fuel composition of the present invention may have a water content in an amount of at least 1, 2, or 4 wt. % and/or not more than 15, 10, or 6 wt. %, as determined according to ASTM test method E203. For example, in certain embodiments, the liquid bio-fuel composition may have a water content of from 1 to 15 wt. %, 2 to 10 wt. %, or 4 to 6 wt. %.

In certain embodiments, the liquid bio-fuel composition of the present invention may include calcium in an amount of less than 5,000 ppmw, less than 1,000 ppmw, or less than 250 ppmw. In one or more embodiments, the liquid bio-fuel composition of the present invention may include potassium in an amount of less than 5,000 ppmw, less than 1,000 ppmw, less than 100 ppmw, less than 10 ppmw, or less than 1 ppmw. In various embodiments, the liquid bio-fuel composition of the present invention may include sodium in an amount of less than 1,000 ppmw, or less than 100 ppmw. In a preferred embodiment, the liquid bio-fuel composition may have a calcium content of not more than 5,000 ppmw, a potassium content of not more than 5,000 ppmw, and a sodium content of not more than 1,000 ppmw. The amount of calcium, potassium, and/or sodium present in the liquid bio-fuel composition may be determined by one skilled in the art using known methods, such as, for example, x-ray fluorescence.

The present invention can result in much more stable bio-fuel compositions, e.g., renewable heating oil compositions, than the prior art. In certain embodiments, the bio-fuel composition of the present invention, e.g., a renewable heating oil composition may have a stability parameter less than 30 centipoise per hour (cP/h), and preferably no greater than 20 cP/h, no greater than 15 cP/h, or no greater than 10 cP/h. In one or more embodiments, the bio-fuel composition may have a stability parameter of less than 30 cP/h, less than 20 cP/h, less than 15 cP/h, less than 10 cP/h, less than 5 cP/h, less than 2 cP/h, less than 1 cP/h, or less than 0.5 cP/h. In a preferred embodiment, the bio-fuel composition may have a stability parameter of less than 30 cP/h. The stability parameter characterizes the stability of a bio-oil over time. As used herein, the "stability parameter" of a bio-oil or bio-fuel, e.g., renewable heating oil, is defined as the slope of a best-fit straight line for a plot of bio-oil viscosity (centipoises) over time (hours), where the plotted viscosity values are of samples of the aged bio-oil at 40° C., the aging process is carried out at 90° C. and the samples are taken at the onset of aging (time=0 hours), 8 hours from the onset of aging, 24 hours from the onset of aging, and 48 hours from the onset of aging. Only data points exhibiting a correlation coefficient greater than 0.9 ($R^2>0.9$) are used to determine the stability parameter. Generally, low stability bio-oil has a stability parameter greater than 75 cP/h, intermediate-stability bio-oil has a stability parameter in the range of 30 to 75 cP/h and high-stability bio-oil has a stability parameter of less than 30 cP/h. Additionally, bio-oil with a stability parameter of less than 1 cP/h can be classified as ultra-stable bio-oil so that high-stability bio-oil is that with a stability parameter below 30 cP/h but at least 1 cP/h.

In one or more embodiments, the bio-fuel of the present invention may be produced via pyrolysis of biomass. In a preferred embodiment, the bio-fuel may be produced via fast pyrolysis. In certain embodiments, production of the inventive bio-fuel, e.g., renewable heating oil, can be achieved by producing a bio-oil derived from a biomass that is converted in a biomass catalytic cracking (BCC) process in accordance with the invention, particularly a BCC process using a transport fluid bed reactor.

Turning now to FIG. 1, which depicts a biomass conversion system 10 that is suitable for producing the bio-fuel composition, e.g., renewable heating oil composition, of the current invention. It should be understood that the biomass conversion system shown in FIG. 1 is just one example of a system within which the present invention can be embodied. The present invention may find application in a wide variety of other systems where it is desirable to efficiently and effectively convert a biomass into a bio-fuel composition, e.g., renewable heating oil composition. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising a cellulose-containing material (cellulosic material). Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice. In a preferred embodiment, the biomass consists essentially of solid particles of wood.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, Mordenite, Beta, Ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a thermochemical conversion reaction that produces bio-oil. The reactor 16 can be any system or device capable of thermochemically converting biomass to bio-oil. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be catalytic enhanced fast pyrolysis or biomass catalytic cracking (BCC). As discussed above, the BCC conversion should occur in an oxygen-poor or, preferably, oxygen-free atmosphere. In one embodiment, BCC is carried out in the presence of an inert gas, such as nitrogen, carbon dioxide, and/or steam. Alternatively, the BCC conversion can be carried out in the presence of a reducing gas, such as hydrogen, carbon monoxide, noncondensable gases recycled from the biomass conversion process, and/or any combination thereof.

The BCC conversion process is characterized by short residence times and rapid heating of the biomass feedstock. The residence times of the conversion can be, for example, less than 10 seconds, less than 5 seconds, or less than 2 seconds. The BCC conversion may occur at temperatures between 200 and 1,000° C., between 250 and 800° C., or between 300 and 600° C.

In a particularly preferred embodiment, the catalyst is used as a heat carrier material and introduced into reactor 16 via line 26 at sufficient temperature to insure that the reaction mixture reaches a temperature between 200 and 1,000° C., between 250 and 800° C., or between 300 and 600° C. In this embodiment, rapid heating of the solid biomass material can generally be accomplished by providing the solid biomass material in the form of particles having a low mean particle diameter. Preferably, the mean particle diameter of the biomass is less than about 2000 μm, and more preferably less than about 1000 μm. The pretreatment of the biomass material can help achieve the desired particle size.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In the case of a BCC process, the solids in the conversion effluent 18 generally comprise particles of char, ash, and/or spent catalyst.

The bio-oil (contained in effluent 18) exiting the biomass conversion reactor 16 will be characterized by being comprised of mainly hydrocarbons and the hydrocarbons consist of (i) an oxygenated component present in an amount such that the renewable heating oil composition has an oxygen content of less than about 30 weight percent, and (ii) a non-oxygenated component having an aromatic content greater than about 40 weight percent. In other embodiments, the oxygenated component is present in an amount such that the renewable heating oil composition has an oxygen content (dry basis) of from about 5 weight percent to about 30 weight percent or, more preferably, from about 6 weight percent to about 20 weight percent, and even more preferably from about 7 to about 15 weight percent. In other embodiments, the aromatic content of the non-oxygenated component will be from about 40 weight percent to about 60 weight percent. In certain embodiments, the bio-fuel exiting the conversion reactor 16 may have the same compositional properties and parameters as discussed above. For example, the bio-fuel exiting the conversion reactor 16 may have the same properties and parameters with respect to the oxygen content, water content, hydrogen content, carbon content, oxygenated hydrocarbon components, nonoxygenated hydrocarbon components, sodium content, potassium content, and/or calcium content as discussed above.

It is a distinct advantage of the current invention that the bio-oil does not need to be treated with an oxygen removing process, such as hydrotreatment, to achieve the above composition. The cost associated with the hydrotreatment process and the necessity to hydrotreat bio-oil before it is suitable for use as a bio-fuel, e.g., a renewable heating oil, renders pyrolysis bio-oils uneconomical for use as heating oil or heating fuel.

As depicted in FIG. 1, the conversion effluent 18 from the biomass conversion reactor 16 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30 exiting the solids separator 20 can then be introduced into a fluids separator 32. As mentioned above, it is preferred and an advantage of the current invention that the bio-oil 30 entering the fluids separator 32 has not previously been subjected to a deoxygenation process such as, for example, hydrotreating. Within fluids separator 32, non-condensable gas is separated from the bio-oil. The fluids separator 32 can be any system capable of separating the bio-oil contained in stream 30 from the non-condensable gas. Suitable systems to be used as the fluids separator 32 include, for example, systems for affecting separation by fractional distillation, heated distillation, extraction, membrane separation, partial condensation, and/or non-heated distillation. As shown in FIG. 1, non-condensable gases 40 removed from the fluids separator 32 may be, optionally, recycled via lines 40 and 42 to the biomass conversion reactor 16 for use as a lift gas.

As discussed above, the resulting bio-fuel composition, e.g., renewable heating oil composition 38, is characterized by a heating value greater than about 10,000 btu/lb without further treatment to remove oxygen, such as in an oxygen-removing hydrotreatment process.

In certain embodiments, the bio-fuel composition may have a total solids content of not more than 2,500, 1,000, or 500 ppmw, as determined according to the method described in Oasmaa, Anja & Peacocke, Cordner, "A Guide to Physical Property Characterization of Biomass-Derived Fast Pyrolysis Liquids" Espoo 2001, Technical Research Center of Finland, VTT Publications 450, pages 22 & 23, where acetone is used as the solvent and a 0.2 µm filter is employed. In one or more embodiments, the bio-fuel composition may have a hard solids content of not more than 1,000, 250, or 75 ppmw, as determined according to ASTM test method D482.

In one or more embodiments, the liquid bio-fuel composition of the present invention may have a Total Acid Number (TAN) of not more than 90, 75, or 60 mg KOH/g, as determined according to ASTM test method D664.

In certain embodiments, the liquid bio-fuel composition of the present invention may have a specific gravity of at least 0.75, 0.8, or 0.9 g/ml and/or not more than 1.1, 1.05, or 1.0 g/ml, as determined according to ASTM test method D1298. For example, in one or more embodiments, the liquid bio-fuel composition may have a specific gravity of from 0.75 to 1.1 g/ml, 0.85 to 1.05 g/ml, or 0.9 to 1.0 g/ml.

In one or more embodiments, the liquid bio-fuel composition of the present invention may have a viscosity at 40° C. of at least 1, 2, 3, or 5 centipoise (cps) and/or not more than 125, 75, 50, or 30 cps, as determined according to ASTM test method D446. For example, in certain embodiments, the liquid bio-fuel composition may have a viscosity at 40° C. of from 1 to 125 cps, 2 to 75 cps, 3 to 50 cps, or 5 to 30 cps. In a preferred embodiment, the liquid bio-fuel composition has a viscosity at 40° C. of not more than 125 cps.

In certain embodiments, the liquid bio-fuel composition of the present invention may have an ignition temperature of at least 150, 175, 200, or 210° C. and/or not more than 350, 300, 275, or 265° C., as determined according to ASTM test method E659. For example, in one or more embodiments, the ignition temperature of the liquid bio-fuel composition may be of from 150 to 350° C., 175 to 300° C., 200 to 275° C., or 210 to 265° C.

In one or more embodiments, the liquid bio-fuel of the present invention may have a flash point of at least 40, 50, or 60° C. and/or not more than 120, 100, and 90° C., as determined according to ASTM test method D93. For example, in certain embodiments, the flash point of the liquid bio-fuel may be of from 40 to 120° C., 50 to 100° C., or 60 to 90° C.

In certain embodiments, the liquid bio-fuel composition of the present invention may have a 10% boiling point of at least 160, 200, or 220° C. and/or not more than 320, 260, or 240° C. For example, in one or more embodiments, the liquid bio-fuel composition may have a 10% boiling point of from 160 to 320° C., 200 to 260° C., or 220 to 240° C. The 10% boiling point refers to the temperature at which 10 wt. % of the composition would boil off. In certain embodiments, the bio-fuel composition of the present invention may have a 50% boiling point of at least 340, 400, or 420° C. and/or not more than 520, 460, or 440° C. For example, in one or more embodiments, the bio-fuel composition may have a 50% boiling point of from 340 to 520° C., 400 to 460° C., or 420 to 440° C. The 50% boiling point refers to the temperature at which 50 wt. % of the composition would boil off. In a preferred embodiment, the liquid bio-fuel has a 10% boiling point in the range of 160 to 420° C. and a 50% boiling point in the range of 340 to 520° C. The 10% and 50% boiling points are determined according to ASTM test method D2887.

In one or more embodiments, the bio-oil obtained from the conversion of biomass material, e.g., as discussed above with reference to FIG. 1, may require processing in order to provide a liquid bio-fuel with compositional properties desired for a particular application. Accordingly, a description of the bio-oil obtained from the conversion of biomass and various methods and processes for its modification into a suitable liquid bio-fuel are discussed below.

In certain embodiments, the bio-oil obtained from the conversion of a biomass material may include a first mixture comprising a first oil phase comprising, consisting of, or consisting essentially of biomass derived carbon containing compounds and a first aqueous phase comprising, consisting of, or consisting essentially of water. In one or more embodiments, the first aqueous phase may comprise, consist of, or consist essentially of water and solids. The first mixture can have a Total Acid Number (TAN) of at least about 2, or at least about 3, or at least about 10, or at least about 20, or at least about 30 mg KOH/g.

The ratio of the specific gravities of the first oil phase to the first aqueous phase ($SGR^1$) can be greater than 1.0, greater than about 1.05, or greater than about 1.1. The specific gravity of at least one of the first oil phase and the first aqueous phase can be modified, thereby resulting in a second mixture having a second oil phase and a second aqueous phase, wherein the ratio of the specific gravities of the second oil phase to the second aqueous phase ($SGR^2$) is less than 1.0, preferably less than about 0.99, and more preferably less than about 0.97.

The modification of the specific gravity of at least one of the first oil phase and the first aqueous phase can include adding at least one specific gravity modifier to the mixture, thereby forming the second mixture.

In certain embodiments, the at least one specific gravity modifier may include a diluent. In such embodiments, a diluent can be combined with the first oil phase, as at least a portion of the specific gravity modifier, thereby forming the second oil phase, resulting in the specific gravity of the second oil phase being lower than the specific gravity of the first oil phase. More particularly, the specific gravity of the second oil phase is less than 1.0. The diluent preferably has a specific gravity less than about 0.97. The diluent can be selected from the group consisting of: light cycle oil, naphtha, toluene, methyl isobutyl ketone, reformate, a bio-oil fraction having a specific gravity lower than the specific gravity of the first oil phase, a hydrotreated bio-oil fraction having a specific gravity lower than the specific gravity of the first oil phase, and combinations thereof.

The bio-oil fraction can be obtained as a fraction of the first oil phase following the specific gravity modification step. A hydrotreated bio-oil fraction can optionally be obtained as a fraction of the first oil phase following hydrotreatment of the first oil phase.

In one or more embodiments, the ratio by volume of the diluent to the first oil phase can be in the range of from about 0.6:1 to about 2.4:1, and more preferably from about 0.6:1 to about 1:1. When light cycle oil is used as the diluent, the ratio by volume of the diluent to first oil phase can be in the range of from about 0.05:1 to about 1:1, or from about 0.05:1 to about 0.2:1.

In certain embodiments, the at least one specific gravity modifier may include a water-soluble compound. In such embodiments, the modification of the specific gravity of at least one of the first oil phase and the first aqueous phase can also include combining a water-soluble compound, as at least a portion of the specific gravity modifier (alone or in addition to the use of a diluent as a specific gravity modifier), with the first aqueous phase, thereby forming the second aqueous phase, and wherein the specific gravity of the second aqueous phase is higher than the specific gravity of the first aqueous phase. Preferably, the specific gravity of the second aqueous phase ends up being greater than about 1.05. The water-soluble compound can be selected from the group consisting of NaCl, MgCl$_2$, KCl, KBr, Na$_2$SO$_4$, NaHCO$_3$, NaOH, KOH, NH$_4$OH, alkyl amines, pyridines, quinolines, H$_2$S, ammonia, ammonium compounds including: nitrates, sulfides, carbonates (such as ammonium bicarbonate), hydroxides, acetates, chlorides, bromides, iodides, and sulfates, and combinations thereof.

The water-soluble compound can be added as a solid and dissolved into the first aqueous phase, and can also, alternatively, be added in the form of a water-soluble compound solution. The water-soluble compound is preferably ammonium bicarbonate, NaCl, or MgCl$_2$. The water-soluble compound is preferably combined with the first aqueous phase in a quantity sufficient to result in a specific gravity of the second aqueous phase which is greater than about 1.05.

In certain embodiments, the at least one specific gravity modifier may include a water-soluble co-solvent. For example, in such embodiments, the modification of the specific gravity of at least one of the first oil phase and the first aqueous phase can also include combining a water-soluble co-solvent, as at least a portion of the specific gravity modifier (alone or in addition to the use of one or both of the diluent or water-soluble compound as specific gravity modifiers), with the first aqueous phase, thereby forming the second aqueous phase, and wherein the specific gravity of the second aqueous phase is higher than the specific gravity of the first aqueous phase. The water soluble co-solvent can be a glycol, and more preferably, is selected from the group consisting of ethylene glycol, polyethylene glycol, propylene glycol, polypropylene glycol, and combinations thereof. The resulting specific gravity of the second aqueous phase is preferably greater than about 1.05.

In one or more embodiments, the at least one specific gravity modifier may include a diluent, a water-soluble compound, and a water soluble co-solvent. In certain embodiments, the at least one specific gravity modifier added to the first mixture can be selected from the group consisting of a light cycle oil, naphtha, toluene, methyl isobutyl ketone, reformate, a bio-oil fraction having a specific gravity lower than the specific gravity of said first oil phase, a hydrotreated bio-oil fraction having a specific gravity lower than the specific gravity of said first oil phase, NaCl, MgCl$_2$, KCl, KBr, Na$_2$SO$_4$, NaHCO$_3$, NaOH, KOH, NH$_4$OH, alkyl amines, pyridines, quinolines, H$_2$S, ammonia, ammonium compounds including: nitrates, sulfides, carbonates (such as ammonium bicarbonate), hydroxides, acetates, chlorides, bromides, iodides, and sulfates, a glycol, and combinations thereof.

In certain embodiments, the second mixture is preferably allowed to settle in a settling vessel, thereby forming an upper layer containing the second oil phase and a lower layer containing the second aqueous phase. The first oil phase can contain solids, which can be present in an amount of at least about 100, or about 1000, or about 3,000 ppmw. The solids can include, but are not limited to, organic and inorganic components, which can include solid catalyst material. Following the settling of the second mixture, the second oil phase in the upper layer contains less solids than the first oil phase; and can contain less than about 25, or about 10, or about 5 wt % of the solids contained in the first oil phase; and preferably contains less than about 80 ppmw solids.

In certain embodiments, where a diluent is used as at least one specific gravity modifier, at least a portion of the second oil phase in the upper layer can be passed to a separator for recovery of at least a portion of the diluent, resulting in a recovered diluent. At least a portion of the recovered diluent can be recycled for use as at least a portion of the specific gravity modifier, e.g., the diluent.

Additionally, when a diluent is used as at least one specific gravity modifier, at least a portion of the second oil phase can be passed to a separator for recovery of at least one bio-oil fraction from the second oil phase. In certain embodiments, at least one of the bio-oil fractions can be utilized as at least a portion of the specific gravity modifier, e.g., a diluent, and added to a first mixture having a first oil phase and a second oil phase to thereby modify the specific gravity of at least one of the first oil phase and the first aqueous phase to thereby form a second mixture having a second oil phase and a second aqueous phase.

Further, in certain embodiments, where a diluent is used as at least one specific gravity modifier, at least a portion of the second oil phase can be passed to a hydrotreater for at least partial hydrotreating, thereby forming a hydrotreated stream. In such embodiments, at least a portion of the hydrotreated stream can be passed to a separator for separation into at least one hydrotreated bio-oil fraction. In one or more embodiments, at least one of the hydrotreated bio-oil fractions can be utilized as at least a portion of the specific gravity modifier, e.g., a diluent, and added to the first mixture having a first oil phase and a second oil phase to thereby modify the specific gravity of at least one of the first oil phase and the first aqueous phase to thereby form a second mixture having a second oil phase and a second aqueous phase.

In certain embodiments, a quantity of a conductivity modifier may be added to the first mixture thereby forming the second mixture, wherein the quantity of the conductivity modifier is sufficient such that the electrical conductivity of the second mixture is lower than the electrical conductivity of the first mixture. The first mixture can have an electrical conductivity of at least about 900,000, or at least about 950,000 nano Siemens per meter (nS/m); and the second mixture preferably has an electrical conductivity less than about 800,000 or less than about 500,000 nS/m. In one embodiment, the conductivity modifier can have a TAN lower than the TAN of the first mixture, and preferably has a TAN of at least about 2 units lower than the TAN of the first mixture. In the same or alternative embodiments, the first mixture may have a TAN greater than zero. The electrical conductivity of the second mixture is preferably less than about 75%, more preferably less than about 50%, and even more preferably less than about 25% of the electrical conductivity of the first mixture.

The conductivity modifier can be selected from the group consisting of an aqueous solution, a fraction separated from the biomass derived carbon containing compounds, a fraction separated from the biomass derived carbon containing compounds following hydrotreatment of the biomass derived carbon containing compounds, and combinations thereof. The conductivity modifier can comprise an aqueous solution having a pH greater than 7 or greater than about 9. The aqueous solution can comprise a base selected from the group consisting of NaOH, KOH, NH$_4$OH, alkyl amines, pyridines, quinolines, ammonia, ammonium compounds including: nitrates, sulfides, carbonates, hydroxides, acetates, chlorides, bromides, iodides, and sulfates, and combinations thereof, and is preferably ammonium bicarbonate or ammonium hydroxide or a combination thereof. Combinations of bases can be added separately or simultaneously as a pre-mixed solution. If added separately, they can be added at different process conditions including different temperature and different pressures. Buffers may also be used to more tightly control pH.

In addition, at least a portion of the first mixture and/or the resulting second mixture can be in the form of an emulsion comprising a portion of the biomass derived carbon containing compounds and a portion of the water. The second mixture, including the conductivity modifier described above, can be subjected to electrostatic dehydration, resulting in at least a partial breaking of the emulsion, and freeing from the emulsion at least 75%, or at least 90%, or at least 95% of the biomass derived carbon containing compounds contained in the emulsion or at least 50%, or at least 70%, or at least 95% of the water contained in the emulsion. Also, the second mixture, following electrostatic dehydration, preferably has an electrical conductivity less than about 250,000 nS/m. The electrostatic dehydration is preferably performed in a desalter vessel. Also, a demulsifier compound can be added to the first mixture, along with the conductivity modifier, thereby forming the second mixture which is then subjected to the electrostatic dehydration. The demulsifier can be an alkoxylate derived from a poly amine.

In addition, either or both the first and second oil phases further comprise metals. In certain embodiments, the metals may be selected from the group consisting of Al, Ca, Mg, Si, Fe, and combinations thereof. At least a portion of these metals can be removed from either the first oil phase or the second oil phase, or both, into either the first or second aqueous phases by contact of either or both of the first mixture and the second mixture with certain acids. If metals are removed from the first oil phase into the first aqueous phase by contact with such acid(s), the conductivity modifier can then optionally be added to form the second mixture, having a reduced electrical conductivity, as described above. The removal of at least a portion of the metals can also take place from the second oil phase into the second aqueous phase following addition of the conductivity modifier, and also optionally, before or after the electrostatic dehydration of the second mixture to at least partially break the emulsion, as described above.

The acid can be selected from the group consisting of sulfuric acid, nitric acid, hydrochloric acid, phosphoric acid, glycolic acid, aminocarboxylic acids, hydroxo-carboxylic acids, dibasic carboxylic acids, monobasic carboxylic acids, carbonic acid, alpha-hydroxy carboxylic acids, and their salts, and combinations thereof. The acid also preferably has a pH less than about 5.

The acid and metal interaction can include, but is not limited to, a process selected from the group consisting of: chemically binding at least a portion of the metals; removing at least a portion of the metals from the first and or second oil phases; or combinations thereof.

In certain embodiments, a liquid bio-fuel processed according to the methods discussed above may include of from 50 to 95 weight percent oxygenated hydrocarbons and of from 5 to 50 weight percent nonoxygenated hydrocarbons. In the same or alternative embodiments, the liquid bio-fuel may include not more than 15 weight percent water. In one or more embodiments, the liquid bio-fuel may have an ignition temperature in the range of 175 to 300° C. In certain embodiments, the liquid bio-fuel may have a higher heating value in the range of at least 9,000 btu/lb.

In one or more embodiments, the liquid bio-fuel processed according to the methods discussed above may have any or all of the compositional properties and parameters of the bio-fuel described above with respect to the process of FIG. 1.

In certain embodiments, a biomass-derived fuel may be used in a fuel-powered device, which can also utilize petroleum-derived fuel, without mechanically modifying the device to account for the use of different fuels (e.g., petroleum-derived or bio-fuel). In certain embodiments, the fuel-powered device may be a boiler, a turbine, an internal combustion engine, or a thermal oxidizer. In one or more embodiments, the fuel-powered device may include a turbine used for power generation.

In various embodiments, the biomass-derived fuel is produced via fast pyrolysis of biomass. In certain embodiments, the biomass can include lignocellulosic biomass. In one or more embodiments, the biomass can include solid particles of wood.

In certain embodiments, the petroleum-derived fuel may be heating oil and/or the biomass-derived fuel may be bio-oil, e.g., bio-fuel. In one or more embodiments, at least one of the heating values, specific gravities, ignition temperatures, and/or flash points of the biomass-derived fuel and the petroleum-derived fuel are within 20, 15, 10, or 5 percent of one another. Further, in certain embodiments, at least one of the heating values, specific gravities, ignition temperatures, and flash points of the biomass-derived fuel and the petroleum-derived fuel are within 20, 15, 10, or 5 percent of one another. In certain embodiments, the heating values of the biomass-derived fuel and the petroleum-derived fuel are both in the range of 7,500 to 17,500 btu/lb. In addition, in one or more embodiments, the specific gravities of the biomass-derived fuel and the petroleum-derived fuel are both in the range of 0.75 to 1.1 g/ml. In certain embodiments, the ignition temperatures of the biomass-derived fuel and the petroleum-derived fuel are both in the range of 150 to 350° C. In various embodiments, the flash points of the biomass-derived fuel and the petroleum-derived fuel are both in the range of 40 to 120° C.

In certain embodiments, the total solids content of both the biomass-derived fuel and the petroleum-derived fuel is not more than 2,500 ppmw. In one or more embodiments, the hard solids content of both the biomass-derived fuel and the petroleum-derived fuel are not more than 1,000 ppmw. In certain embodiments, the biomass-derived fuel has a 10% boiling point in the range of 160 to 320° C., a 50% boiling point in the range of 340 to 520° C., and a 90% boiling point in the range of 620 to 940° C., determined according to ASTM test method D2887.

The following examples are provided to further illustrate this invention and are not to be considered as unduly limiting the scope of this invention.

EXAMPLES

Example 1

Three bio-oil samples were produced from the conversion of yellow pine particles. Sample A was produced by biomass catalytic cracking using a clay-type catalyst in a riser reactor operated at a reactor outlet temperature of about 550° C. Samples B and C were produced by biomass catalytic cracking using a zeolite-type catalyst in a riser reactor operated at a reactor outlet temperature of about 600° C. The oxygen content and heating value of the bio-oil were determined by ASTM D5291 and ASTM D240 test methods, respectively. The results are shown in Table 1.

TABLE 1

|  | Sample A | Sample B | Sample C |
|---|---|---|---|
| Oxygen Content (% wt.) | 24 | 17 | 10 |
| Heating Value (btu/lb) | 11,261 | 13,727 | 15,156 |

Example 2

Stability was assessed for four samples of bio-oil based on changes in viscosity using an accelerated thermal stability test based on the observations of Czernik et al. as reported in Czernik, S.; Johnson, D. K. and Black, S. *Stability of wood fast pryrolysis oil*. Biomass and Bioenergy 1994. 7 (1-6), 187-192. Czernik et al. illustrates that viscosity changes for bio-oil stored 12 weeks at 37° C. corresponds to 6 hours at 90° C. and, hence, that viscosity changes for bio-oil stored 1 year at 37° C. corresponds to 24 hours at 90° C. The accelerated thermal stability test used for the inventive bio-oil samples in these examples comprised heating the samples to 90° C. and holding the samples at that temperature for 48 hours. Test amounts were taken from the samples at 0, 8, 24 and 48 hours and viscosity measurements were taken with the test amount temperature being at 40° C. Viscosity was measured using a modified version of ASTM D2983 using a higher temperature than standard due to the high viscosity of bio-oil at low temperature. Viscosity was measured at 40° C. using a Brookfield viscometer. As indicated above, the increase in viscosity under these conditions correlates with room temperature storage such that 24 hours of testing time at 90° C. is equal to the change in a year at near room temperature storage. The accelerated aging test correlates well with the chemical changes in the liquid, associated to polymerization or condensation reactions. (See also, Oasmaa, A. and Kuoppala, E. *Fast pyrolysis of forestry residue. 3. Storage stability of liquid fuel*. Energy and Fuels 2003, 17 (4), 1075-85.)

Figure 2:
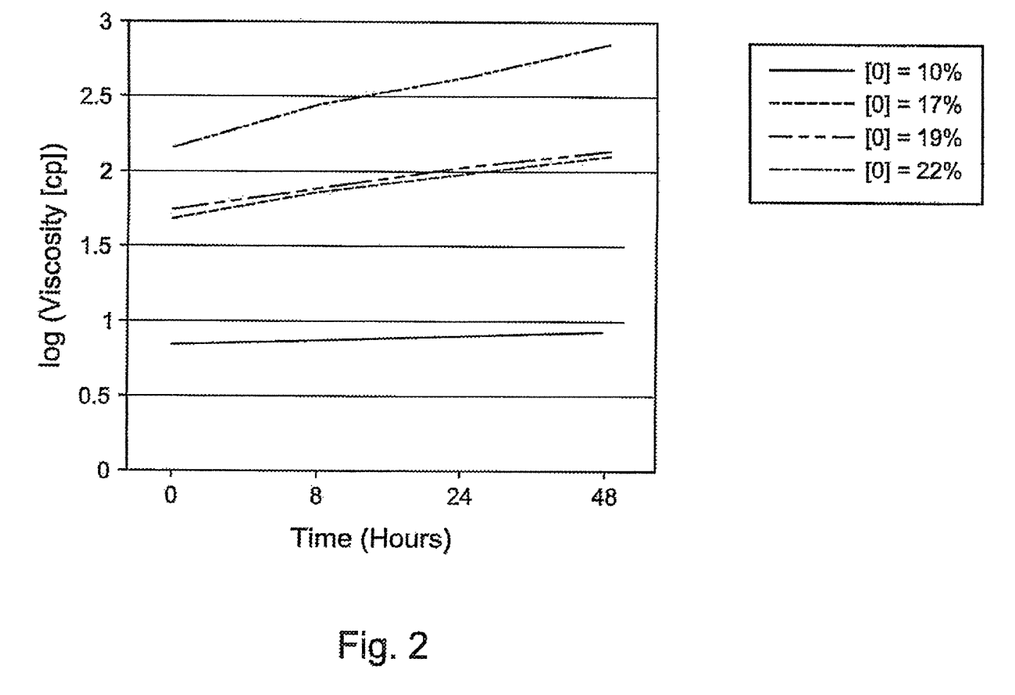
FIG. 2 is graph illustrating the determination of the stability parameter of bio-oil samples.
Figure 3:
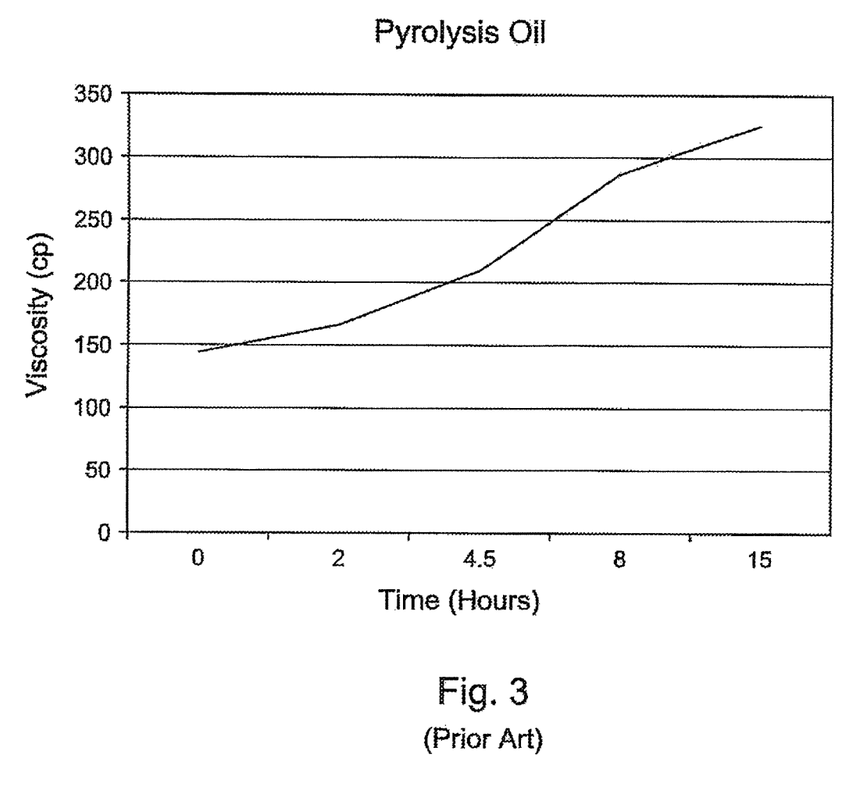
FIG. 3 is a graph illustrating data on the stability of pyrolysis oil at 90° C. taken from Table 2 of Czernik, S.; Johnson, D. K. and Black, S. *Stability of wood fast pyrolysis oil*. Biomass and Bioenergy 1994. 7 (1-6), 187-192.

Four bio-oil samples, representative of the present invention, were produced from the conversion of yellow pine particles by biomass catalytic cracking using a zeolite-type catalyst in a riser reactor operated at a reactor outlet temperature of about 500 to 600° C. The results of the stability test are illustrated in FIG. 2. For comparison, as reported in Czernik et al., typical pyrolysis oils submitted to this accelerated thermal stability test have all shown a nearly 100% increase in viscosity after eight hours (see FIG. 3, which is a graphical representation of viscosity data for stored pyrolysis oil at 90° C. taken from Table 2 of Czernik et al.)

Example 3

Three additional bio-oil samples produced from southern yellow pine by biomass catalytic cracking using a zeolite-type catalyst in a riser reactor operated at a reactor outlet temperature of about 500 to 650° C. The three bio-oil samples were subjected to the accelerated thermal stability test in order to establish the effect of increased stability in the heat value of bio-oils. As shown in Table 2, ultra-stable bio-oils (bio-oils with a stability parameter of less than 1 cP/h) all exhibited low oxygen content and heating values greater than 10,000 btu/lb. Accordingly, the ultra-stable bio-oils all had superior heating value.

TABLE 2

| Sample | [O] (wt %) | Stability Parameter (cps/h) | Heating Value (BTU/lb) |
|---|---|---|---|
| Sample 8 | 9 | 0.13 | 15200 |
| Sample 9 | 10 | 0.26 | 14939 |
| Sample 10 | 12 | 0.33 | 14500 |

Example 4

A corrosion test was performed according to general test procedures ASTM G31 on stainless steel, at two different temperatures for the liquid and vapor phases of heating bio-oil samples produced from southern yellow pine by biomass catalytic cracking using a zeolite-type catalyst in a riser reactor operated at a reactor outlet temperature of about 500 to 650° C. The samples contained 10 and 17% wt. oxygen, produced as in Example 1. No corrosion was detectable.

Example 5

A product mixture produced from the thermo-catalytic pyrolysis of southern yellow pine wood chips was collected and allowed to settle. The organic phase (raw bio-oil) for the product mixture settled to a position below the water phase. A 45 ml. quantity of the raw bio-oil, separated from the product mixture, was mixed with a 45 ml. quantity of an un-hydrotreated bio-naphtha fraction of the bio-oil (bio-naphtha). A 10 ml. quantity of process water separated from the product mixture was also added to the raw bio-oil and bio-naphtha. A total of twenty four (24) 100 ml. samples were prepared in this way. The resulting samples were each mixed for around 20 seconds and placed in a 140° F. water bath for around 1 hour. Upon settling, the organic phase (blended bio-oil) layer for each sample was flipped and on top, with the water phase on the bottom of the containers. The blended bio-oil for each sample was then extracted and all extracted blended bio-oils combined in one container. The container was then mixed for around 20 seconds and an aliquot was tested for filterable solids through a 0.2 μm PVDF membrane filter. A sample of the raw bio-oil separated from the product mixture was also tested for filterable solids through a 0.2 μm PVDF membrane filter. The amount of solids in the blended (flipped) bio-oil was about 610 ppm (with 1220 ppm attributed to the raw bio-oil portion), compared to about 3,558 ppm for the un-flipped raw bio-oil.

As can be seen from the data above, the solids content in the bio-oil drops significantly once the oil and water layers are flipped. This provides substantial benefits for downstream processing of the bio-oil, such as hydrotreatment, and significantly reduces the cost of any subsequently required solids removal.

Example 6

A product mixture produced from the thermo-catalytic pyrolysis of southern yellow pine wood chips was collected and allowed to settle. The organic phase (raw bio-oil) for the product mixture settled to a position below the water phase. A 100 ml. quantity of the raw bio-oil, separated from the product mixture, was mixed with a 100 ml. quantity of an un-hydrotreated bio-naphtha fraction of the raw bio-oil. The 200 ml. bio-oil/bio-naphtha mixture was split into four samples. Each of the four samples was combined with 50 ml. quantities of process water separated from the product mixture. Three different demulsifier additives were added to three of the samples. The four samples were each mixed for around 20 seconds and placed in a 140° F. water bath for around 30 minutes. The organic phase (blended bio-oil) layer for each sample was flipped and on top, with the water phase on the bottom of the containers. The blended bio-oil for each sample was then extracted. Each of the four extracted blended bio-oils were mixed for around 20 seconds, and aliquots of each were tested for filterable solids through a 0.2 μm PVDF membrane filter. The amount of solids contained in the three blended (flipped) bio-oil samples including desalter additives were about 205, 193, and 400 ppm; and the amount of solids contained in the blended (flipped) bio-oil sample not including a desalter additive was about 492 ppm. The desalter additives used were from Champion Technologies and designated as XZ-1677, Code 80 and EC-1-C, respectively.

Example 7

A product mixture produced from the thermo-catalytic pyrolysis of southern yellow pine wood chips was collected and allowed to settle. The organic phase (raw bio-oil) for the product mixture settled to a position below the water phase. A quantity of the total product mixture was mixed with a quantity of a Light Cycle Oil (LCO) obtained from a crude oil refinery. The product mixture/LCO mixture was vigorously mixed for around 30 seconds. The product mixture/LCO mixture was then centrifuged to separate out the blended bio-oil. The blended bio-oil, as well as a sample of the raw bio-oil from the product mixture, were then tested for ash content. The ash content of the blended bio-oil was only about 0.007 wt %, compared to about 0.146 wt % for the control raw bio-oil.

As can be seen from the data above, the ash content in the bio-oil drops significantly once the oil and water layers are flipped.

Example 8

A product mixture produced from the thermo-catalytic pyrolysis of southern yellow pine wood chips was collected and allowed to settle. The organic phase (raw bio-oil, pH of about 4.5) for the product mixture settled to a position below the product water phase (pH of about 4-5). Three separate quantities of the total product mixture were mixed with quantities of LCO sufficient such that the resulting organic phases of the mixtures contained about 5 wt %, about 10 wt %, and about 20 wt % LCO, respectively. The density of the product water portions of the three mixtures were also modified by adding NaCl such that the resulting product water for each mixture contained about 2M NaCl. For each of the mixtures, the organic phase (blended bio-oil) layer was flipped and on top, with the 2M NaCl product water phase on the bottom of the container. The density of the bio-oil vs. percent of LCO added is shown in Table 3 below.

TABLE 3

| | % LCO in blended bio-oil | | | |
| --- | --- | --- | --- | --- |
| | 0 | 5 | 10 | 20 |
| Blended bio-oil (Density (g/ml) | 1.10 | 1.08 | 1.07 | 1.05 |

Example 9

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). NaCl was added to five of the bio-oil/water mixtures such that the distilled water portions separately contained about 1M NaCl, about 2M NaCl, about 3M NaCl, about 4M NaCl, and about 5M NaCl, respectively. For each of the 3M, 4M, and 5M NaCl mixtures, the organic phase (blended bio-oil) layer was clearly flipped and on top, with the water phase on the bottom of the container. For the 2M NaCl mixture, the layers were mostly, but not completely, flipped, and the layers were not flipped for the 1M NaCl mixture.

Example 10

A product mixture produced from the thermo-catalytic pyrolysis of southern yellow pine wood chips was collected and allowed to settle. The organic phase (raw bio-oil, pH of about 4.5, density of about 1.095) for the product mixture settled to a position below the product water phase. Six separate quantities of the bio-oil (separated from the product water) were mixed with quantities of distilled water (pH of about 7). $MgCl_2$ was added to five of the bio-oil/water mixtures such that the distilled water portions separately contained about 1M $MgCl_2$, about 2M $MgCl_2$, about 3M MgCl$_2$, about 4M MgCl$_2$, and about 5M MgCl$_2$, respectively. For each of the 3M, 4M, and 5M MgCl$_2$ mixtures, the organic phase (blended bio-oil) layer was clearly flipped and on top, with the water phase on the bottom of the container. For the 2M MgCl$_2$ mixture, the layers were partially flipped, and the layers were not flipped for the 1M MgCl$_2$ mixture.

Example 11

A product mixture produced from the thermo-catalytic pyrolysis of southern yellow pine wood chips was collected and allowed to settle. The organic phase (raw bio-oil, pH of about 4.5, density of about 1.085) for the product mixture settled to a position below the product water phase (pH .about.4-5). The product mixture was separated into six quantities. NaCl was added to five of the product mixture samples such that those five product water portions separately contained about 1M NaCl, about 2M NaCl, about 3M NaCl, about 4M NaCl, and about 5M NaCl, respectively. For each of the 3M, 4M, and 5M NaCl mixtures, the organic phase layer was clearly flipped and on top, with the product water phase on the bottom of the container.

Example 12

A product mixture produced from the thermo-catalytic pyrolysis of southern yellow pine wood chips was collected and allowed to settle. The organic phase (raw bio-oil) for the product mixture settled to a position below the water phase, and had a TAN of 6.1. A 20.1 gram quantity of ammonium bicarbonate was combined with an 82 gram quantity of process water separated from the product mixture to form a modified water solution containing about 19.7 wt % ammonium bicarbonate. A 19.9 gram quantity of the modified water solution was combined with 91 grams of the raw bio-oil separated from the product mixture. The organic phase (raw bio-oil) layer was flipped and on top, with the modified water phase on the bottom of the container.

Example 13

Raw bio-oil was separated from a product mixture produced from the thermo-catalytic pyrolysis of southern yellow pine wood chips. The raw bio-oil had a TAN of 6.1; 3.2 vol % water (determined by the Karl Fischer titration method); and 5,000 ppm solids. A quantity of the raw bio-oil was blended with a quantity of a bio-naphtha fraction separated from the raw bio-oil by distillation to form a 50/50 blend (by volume). The 50/50 blend contained about 4.0 wt % BS&W (basic sediment and water). A quantity of the 50/50 blend was centrifuged, removing a major portion of the free water and solids, amounting to about 3 wt %, resulting in a centrifuged blend containing about 1.0 wt % BS&W. A quantity of the centrifuged blend was then neutralized with a 3 wt % NaOH aqueous solution to reduce the TAN to about 0 (no TAN measurable). For maximum dehydration, the neutralized blend was also treated at 2.5 kV/inch AC electricity following addition of 100 ppm of a demulsifier obtained from Croda, commercially available under the trade name Croda D510. The resulting neutralized blend contained about 0 wt % (trace) BS&W. Each of the 50/50 blend, the centrifuged blend, and the neutralized blend were tested for conductivity at various temperatures. Results of such tests are shown in Table 4 below.

TABLE 4

| | "As Is" 50/50 Blend | Centrifuged Blend | Neutralized and Electrostatically Treated Blend |
|---|---|---|---|
| BS&W | ~4% | ~1% | ~0% |
| Temp. (° F.) | | Specific Conductivity (nS/m) | |
| 80 | 1,150,000 | 296,667 | — |
| 90 | — | — | 67,333 |
| 120 | — | 373,333 | 88,667 |
| 160 | — | 502,000 | 120,667 |
| 200 | — | 590,000 | 139,333 |
| 240 | — | 702,667 | 140,667 |
| 280 | — | 826,667 | 133,333 |

As can be seen from the data in Table 4, the addition of a neutralizing base to the bio-oil/bio-naphtha blend, along with electrostatic treatment, results in a significant decrease in conductivity. Thus, rather than leading to an expected increase in conductivity, it was unexpectedly found that the addition of a base to the system actually reduced the conductivity.

Example 14

Raw bio-oil was separated from a product mixture produced from the thermo-catalytic pyrolysis of southern yellow pine wood chips. A quantity of the raw bio-oil was blended with a quantity of an un-hydrotreated bio-naphtha fraction of the raw bio-oil to form a 50/50 blend (by volume), which was then stirred for 1 hour at 300 RPM. For each of the acid treatment tests, an 80 ml quantity of the blend was mixed with 20 ml of an aqueous acid solution, and blended for 15 seconds. The aqueous acid solutions were prepared by mixing the acids into process water produced in the thermo-catalytic pyrolysis of the wood chips. As a control, one of the tested samples was prepared using process water without added acid. The samples were placed in a 140 F water bath for 30 minutes. The samples were then filtered through a 0.2 .mu.m PVDF membrane filter and tested for metals using inductively coupled plasma mass spectrometry (ICP-MS). The metals content results are shown in Table 5 below.

TABLE 5

| Metal | Raw Bio-oil | 5% Sulfuric Acid | 5% Phosphoric Acid | Blank (no added acid) | 5% Nitric Acid | 5% Glycolic Acid |
|---|---|---|---|---|---|---|
| Al | 98.5 | 0 | 1.147 | 8.27 | 0.1339 | 2.998 |
| Ca | 69 | 0.56 | 0.797 | 0.4383 | 0.4059 | 1.129 |
| Cl | 0.749 | 0.2386 | 0.3886 | 0.563 | 0.3327 | 0.2361 |
| Co | 0.0427 | 0.0705 | 0.1086 | 0.1128 | 0 | 0.0847 |
| Cr | 0.3501 | 0 | 0.0102 | 0 | 0.003 | 0.0063 |
| Cu | 0.1094 | 0 | 0.032 | 0.0556 | 0.0371 | 0.032 |
| Fe | 12.33 | 0.0507 | 0.2298 | 4.615 | 0.596 | 2.287 |

TABLE 5-continued

| Metal | Raw Bio-oil | 5% Sulfuric Acid | 5% Phosphoric Acid | Blank (no added acid) | 5% Nitric Acid | 5% Glycolic Acid |
|---|---|---|---|---|---|---|
| K | 14.07 | 0.0057 | 0.0665 | 0.0096 | 0.0132 | 0.0354 |
| Mg | 20.71 | 0 | 0.0176 | 0.0092 | 0 | 0.012 |
| Mn | 8.44 | 0.2603 | 0.0999 | 0.0941 | 0 | 0.0043 |
| Mo | 0.0143 | 0 | 0.0222 | 0 | 0 | 0 |
| Na | 1.16 | 2.999 | 12.19 | 3.195 | 0.2063 | 3.083 |
| Ni | 0.1241 | 0.0507 | 0.0516 | 0.0395 | 0.0596 | 0.0654 |
| P | 64.3 | 0.3506 | 1.731 | 0.723 | 1.168 | 0.512 |
| S | 9.66 | 0 | 0 | 0 | 0 | 0 |
| Si | 9.68 | 0.0581 | 0.0597 | 0.0668 | 0 | 0 |
| Ti | 2.237 | 0.562 | 0.2747 | 0.809 | 0 | 0.562 |
| V | 3.139 | 0 | 0.2057 | 1.468 | 0.0351 | 1.444 |
| Zn | 1.269 | 0.0249 | 0.0634 | 0.182 | 0.0126 | 0.2116 |
| Total Metals | 315.885 | 5.2311 | 17.4955 | 20.6509 | 3.0034 | 12.7028 |

As can be seen from the test results in Table 5, contacting bio-oil, which contains metals, with an aqueous acid solution including the above acids results in a substantial lowering of the wt. % of dissolved metals in the resulting treated bio-oil.

While the technology has been particularly shown and described with reference to specific embodiments, it should be understood by those skilled in the art that various changes in form and detail may be made without departing from the spirit and scope of the technology as defined by the appended claims.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A liquid bio-fuel comprising: 50 to 95 weight percent oxygenated hydrocarbons; 5 to 50 weight percent nonoxygenated hydrocarbons; not more than 15 weight percent water; and not more than 2,500 ppmw solids, wherein said liquid bio-fuel has an ignition temperature in the range of 175 to 300° C. and a higher heating value at least 9,000 btu/lb.

2. The liquid bio-fuel of claim 1 having a stability parameter of not more than 20 cP/h, wherein cP/h is viscosity in units of centipoise per hour.

3. The liquid bio-fuel of claim 1 having an oxygen content of not more than 20 weight percent.

4. The liquid bio-fuel of claim 1 having a total acid number of not more 90 mg KOH/g.

5. The liquid bio-fuel of claim 1 having a hard solids content of not more than 1,000 ppmw.

6. The liquid bio-fuel of claim 1 having a viscosity at 40° C. of not more than 125 cps.

7. The liquid bio-fuel of claim 1 having an aromatic content of at least 40 weight percent based on the total weight of said nonoxygenated hydrocarbons and a phenolic content of not more than 80 weight percent based on the total weight of said oxygenated hydrocarbons.

8. The liquid bio-fuel of claim 1 having a 10% boiling point in the range of 160 to 420° C., a 50% boiling point in the range of 340 to 520° C., and a 90% boiling point in the range of 620 to 940° C.

9. The liquid bio-fuel of claim 1 having a specific gravity in the range of 0.75 to 1.1, a flashpoint in the range of 40 to 120° C., a calcium content of not more than 5,000 ppmw, a potassium content of not more than 5,000 ppmw, and a sodium content of not more than 1,000.

10. The liquid bio-fuel of claim 1 comprising 75 to 90 weight percent of said oxygenated hydrocarbons; 10 to 25 weight percent of said nonoxygenated hydrocarbons; in the range of 2 to 10 weight percent of said water; and not more than 500 ppmw of said solids, wherein said ignition temperature is in the range of 210 to 265° C. and said higher heating value is in the range of 10,500 to 13,500 btu/lb.

11. The liquid bio-fuel of claim 1, wherein said liquid bio-fuel has been produced via pyrolysis of biomass.

12. The liquid bio-fuel of claim 11, wherein said pyrolysis is fast pyrolysis and said biomass comprises lignocellulosic biomass.

13. A liquid bio-fuel composition comprising: oxygenated hydrocarbons in an amount such that said bio-fuel has an oxygen content of less than 30 weight percent; and nonoxygenated hydrocarbons having an aromatic content greater than 40 weight percent, wherein the high heating value of said bio-fuel is greater than 10,000 btu/lb., wherein said bio-fuel has a stability parameter of less than 30 cP/h, wherein cP/h is viscosity in units of centipoise per hour.

14. The liquid bio-fuel of claim 13 having said stability parameter of less than 20 cP/h, wherein cP/h is viscosity in units of centipoise per hour.

15. The liquid bio-fuel of claim 13 having an oxygen content in the range of 7 to 15 weight percent.

16. The liquid bio-fuel of claim 13, wherein said nonoxygenated hydrocarbons have an aromatic content of not more than 60 weight percent, wherein said oxygenated hydrocarbons have a phenolic content of not more than 80 weight percent based on the total weight of said oxygenated hydrocarbons.

17. The liquid bio-fuel of claim 13, wherein said liquid bio-fuel is produced via fast pyrolysis of biomass particles.

18. The liquid bio-fuel of claim 17, wherein said biomass particles comprise lignocellulose.

19. The liquid bio-fuel of claim 13 having a 10% boiling point in the range of 160 to 420° C., a 50% boiling point in the range of 340 to 520° C., and a hard solids content of not more than 1,000 ppmw, and a total acid number of not more 90 mg KOH/g.

20. A method of operating a fuel-powered device, said method comprising:
 (a) combusting a petroleum-derived fuel in a fuel-powered device to thereby produce thermal and/or mechanical energy; and
 (b) combusting a biomass-derived fuel in said fuel-powered device to thereby produce thermal and/or mechanical energy,
 wherein said fuel-powered device is not mechanically modified to account for the fuel change between steps (a) and (b),
 wherein said biomass-derived fuel is produced via pyrolysis of biomass, wherein said bios mass-derived fuel comprises a liquid bio-fuel comprising 50 to 95 weight percent oxygenated hydrocarbons, 5 to 50 weight percent nonoxygenated hydrocarbons, not more than 15 weight percent water, and not more than 2,500 ppmw solids, wherein said liquid bio-fuel has an ignition temperature in the range of 175 to 300° C. and higher heating value at least 9,000 btu/lb.

21. The method of claim 20, wherein said fuel-powered device is a boiler, a turbine, an internal combustion engine, or a thermal oxidizer.

22. The method of claim 20, wherein said petroleum derived fuel is heating oil.

23. The method of claim 20, wherein said biomass-derived fuel is bio-oil.

24. The method of claim 20, wherein said fuel-powered device is a turbine used for power generation.

25. The method of claim 20, wherein the heating values, specific gravities, ignition temperatures, and/or flash points of said biomass-derived fuel and said petroleum-derived fuel are within 20 percent of one another.

26. The method of claim 20, wherein the heating values of said biomass-derived fuel and said petroleum-derived fuel are within 15 percent of one another, wherein the heating values of said biomass-derived fuel and said petroleum-derived fuel are both in the range of 9,000 to 15,500 btu/lb.

27. The method of claim 20, wherein the specific gravities of said biomass-derived fuel and said petroleum-derived fuel are within 15 percent of one another, wherein the specific gravities of said biomass-derived fuel and said petroleum-derived fuel are both in the range of 0.75 to 1.1 g/ml.

28. The method of claim 20, wherein the ignition temperatures of said biomass-derived fuel and said petroleum-derived fuel are within 15 percent of one another.

29. The method of claim 20, wherein the flash points of said biomass-derived fuel and said petroleum-derived fuel are within 15 percent of one another, wherein the flash points of said biomass-derived fuel and said petroleum-derived fuel are both in the range of 40 to 120° C.

30. The method of claim 20, wherein the heating values, specific gravities, ignition temperatures, and flash points of said biomass-derived fuel and said petroleum-derived fuel are within 10 percent of one another.

31. The method of claim 20, wherein the total solids content of both said biomass-derived fuel and said petroleum-derived fuel is not more than 2,500 ppmw and the hard solids content of both said biomass-derived fuel and said petroleum-derived fuel is not more than 1,000 ppmw.

32. The method of claim 20, wherein said biomass-derived fuel has a 10% boiling point in the range of 160 to 320° C. and a 50% boiling point in the range of 340 to 520° C.

33. The method of claim 20, wherein said biomass comprises lignocellulosic biomass.

* * * * *